July 31, 1934.  C. W. DIXON  1,968,517

WATER SUPPLY SHUT-OFF

Filed Dec. 23, 1932

Inventor
Clell W. Dixon,

By *Clarence A. O'Brien*
Attorney

Patented July 31, 1934

1,968,517

UNITED STATES PATENT OFFICE 1,968,517

WATER SUPPLY SHUT-OFF

Clell W. Dixon, Corydon, Iowa

Application December 23, 1932, Serial No. 648,675

1 Claim. (Cl. 137—68)

This invention appertains to new and useful improvements in water supply cut-offs particularly adapted for poultry and cattle watering troughs.

The principal object of this invention is to provide a float controlled cut-off which will be efficient in operation and not susceptible to the development of ready defects.

Other objects and advantages of the invention will become apparent to the reader of the following specification.

In the drawing:—

Figure 1:
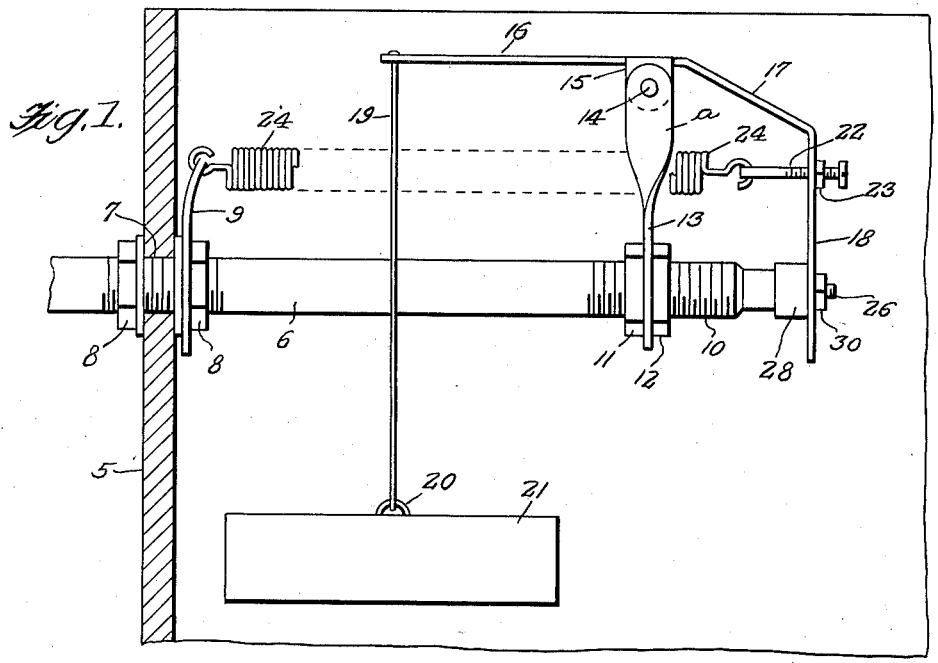
Figure 1 represents a fragmentary vertical sectional view through a trough showing in side elevation, the novel shut-off.
Figure 2:
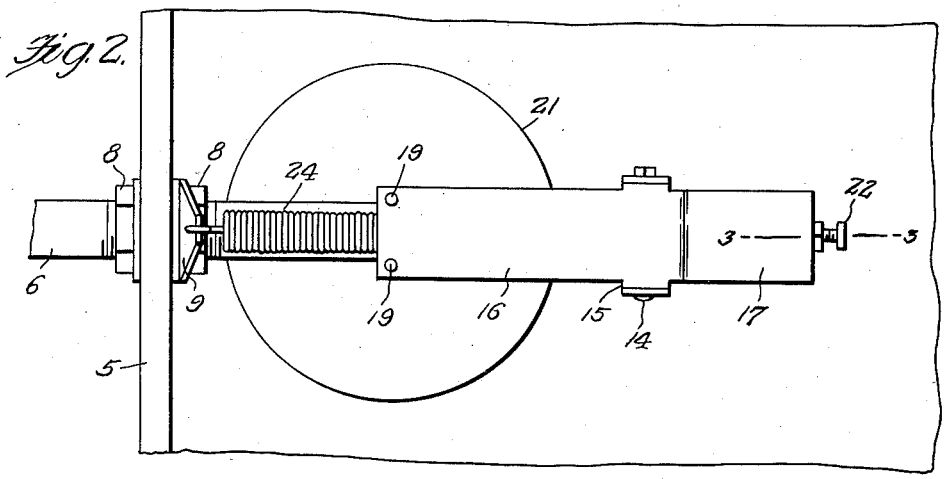
Fig. 2 represents a fragmentary top plan view showing the cut-off mechanism.

Referring to the drawing wherein like numerals designate like parts, it can be seen that numeral 5 represents one side wall of a water trough, the same being provided with an opening therein through which extends the water supply pipe 6 having a threaded portion 7 at the point where it passes thru the trough wall to carry the nuts 8 which are jammed against the wall 5 in the manner shown in Fig. 1.

The nut 8 on the inside of the tank clamps a plate 9 against the wall for a purpose which will be described hereinafter.

The inner end of the supply pipe 6 is threaded as at 10 for carrying a pair of nuts 11—12. The nut 11 serves as an abutment against which the upright 13 is clamped by the jamb nut 12. This upright 13 is of course provided with a circular opening for receiving the pipe 6 and the nut 12 clamps the lower portion of the same against the nut 11, so that it will assume the upright position shown clearly in Fig. 1.

The upper portion of this upright 13 is twisted to a right angular position as denoted by $a$ in Fig. 1 and extending through this portion is the pin 14 which extends through the depending ears 15 on the rocker 16. This rocker 16 is provided with an inclined portion 17 at one side of the pin 14, merging with the depending legs 18, while the opposite end of the rocker has a strand or strands 19 extending downwardly therefrom to connect as at 20 to the float 21.

Slidably disposed through an opening in the leg portion 18 is the adjusting screw 22 capable of being adjusted by the nut 23 thereon which abuts the leg 18 in the manner shown. This screw has an eye at one end with which one end of the screw 24 engages. The opposite end of the screw engages through an eye or opening in the aforementioned plate 9.

It can thus be seen that this spring 24 serves to maintain the lower end portion of the leg 18 urged toward the outlet end of the pipe 6.

Figure 3:
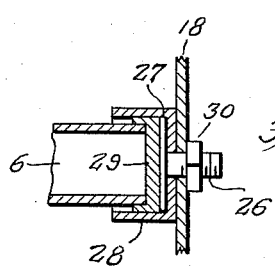
Fig. 3 represents a fragmentary detailed sectional view taken substantially on line 3—3 of Fig. 2.

As is apparent in Fig. 3, the lower portion of this leg 18 is formed with an opening through which extends the threaded shank 26, this shank extending from a plate 27 located on the inside of the cup 28. On the inside of the cup is located the packing disk 29 and a nut 30 is located on the shank and abuts the leg 18 to firmly secure the cup 28 to the said leg.

The cup is sufficiently large to easily receive the discharge end of the supply pipe 6 and the spring 24 is of sufficient tension to maintain the cup with the packing 29 snugly against the outlet end of the pipe 6, so that when the float is in elevated position no water will be discharged.

However, the float 21 is of sufficient weight to overcome the spring 24, and as the water level recedes, the pull on the rocker 16 will overcome the tension of the spring 24 and permit the cup 28 to remove from the discharge end of the pipe 6.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In combination, a tank having side walls, a water supply pipe extending into the tank through one wall thereof, the inner end of the pipe being provided with threads, an upright member provided with an opening at its lower end to receive the threaded portion of the pipe, a pair of jamb nuts on the threaded portion of the pipe to clamp against opposite sides of the said upright member, a rocker mounted on the upright, a depending leg at one end of the rocker, a valve element on the leg engageable against the inner end of the pipe, a float in the tank, a connection between the float and the opposite end of the rocker, said supply pipe being provided with a threaded portion at the wall through which it extends, a nut on the last mentioned threaded portion of the pipe, a lug having an eye, said lug being clamped against the wall of the tank by the last mentioned nut, and an extensible coiled spring interposed between the said lug and the leg of the rocker to normally maintain the valve engaged against the supply pipe.

CLELL W. DIXON.